United States Patent [19]

Pinchuk

[11] Patent Number: 4,810,749

[45] Date of Patent: Mar. 7, 1989

[54] POLYURETHANES

[75] Inventor: Leonard Pinchuk, Miami, Fla.

[73] Assignee: Corvita Corporation, Miami, Fla.

[21] Appl. No.: 156,361

[22] Filed: Feb. 12, 1988

Related U.S. Application Data

[60] Division of Ser. No. 49,038, May 4, 1987, Pat. No. 4,739,013, which is a continuation of Ser. No. 811,105, Dec. 19, 1985, abandoned.

[51] Int. Cl.$^4$ ............................................. C08G 18/70
[52] U.S. Cl. ..................... 524/730; 264/205; 264/211; 264/211.12; 524/731; 528/76; 528/80; 528/83
[58] Field of Search .................. 524/730, 731; 528/76, 528/80, 83; 264/205, 211, 211.12

[56] References Cited

U.S. PATENT DOCUMENTS

| | | | |
|---|---|---|---|
| 3,043,807 | 7/1962 | Snyder et al. | 528/76 |
| 3,243,475 | 3/1966 | Reischl et al. | 528/80 |
| 3,542,903 | 11/1970 | Congiundi et al. | 528/83 |
| 3,562,352 | 2/1971 | Nyilas | 528/76 |
| 4,000,218 | 12/1976 | Critchfield et al. | 528/76 |
| 4,202,807 | 5/1980 | Moretto et al. | 528/83 |
| 4,289,838 | 9/1981 | Rowe et al. | 528/83 |
| 4,376,834 | 3/1983 | Goldwasser et al. | 528/80 |

OTHER PUBLICATIONS

Annis et al, "An Elastomeric Vascular Prosthesis", *Trans, Am, Soc. Artif. Intern. Organs,* vol. XXIV, pp. 209–214, 1978.

Leidner et al, "A Novel Process for the Manufacturing of Porous Grafts: Process Description and Product Evaluation", *Journal of Biomedical Materials Research,* vol. 17, pp. 229–247, 1983.

*Primary Examiner*—Maurice J. Welsh
*Attorney, Agent, or Firm*—Lockwood, Alex, Fitzgibbon & Cummings

[57] ABSTRACT

Polyurethanes are provided which have a polymeric backbone including recurring urethane or urea groups or both and which are reaction products including macroglycols, diisocyanates, and preferably chain extending agents. The polyurethanes may take the form of poly(fluorosilicone urethanes) and include recurring organosilicone moieties from a fluoroalkylsiloxane reactant. When it is desired that these polyurethanes be capable of forming fibers in air, then the reactant charge should be such that the ratio of isocyanate equivalents to hydroxyl equivalents is less than 1.

27 Claims, No Drawings

POLYURETHANES

This is a divsion of applicaiton Ser. No. 049,038 filed May 4, 1987, now U.S. Pat. No. 4,739,013 which is a continuation of Ser. No. 811,105, filed Dec. 19, 1985, now abandoned.

BACKGROUND AND DESCRIPTION OF THE INVENTION

The present invention generally relates to polyurethanes, more particularly block polymers or copolymers of a polyurethane and a fluoroalkylsiloxane, as well as polyurethane homopolymers that are spinnable in air. The polyurethane copolymers likewise can be formulated so as to be spinnable in air or thermoplastic, or they can, if desired, be formulated so as to be generally thermosetting or tailored for injection molding or extrusion molding uses. When an air spinnable polyurethane homopolymer or copolymer is desired, the ratios of reactant equivalents are tailored so as to be hydroxyl-rich and not isocyanate-rich. The polyurethane-fluoroalkylsiloxane copolymers not only can be thus formulated so as to be spinnable in air, but also they provide improved properties over polyurethane homopolymers with respect to features such as solvent resistance, biological resistance, thromboresistance, and tensile strength.

Over the years, numerous approaches have been taken in an effort to provide polymers that are suitable for spinning or molding. Some of these approaches have involved the use and development of polyurethane materials which tend to possess desirable properties such as toughness, good abrasion resistance, generally advantageous flexibility properties, and good adhesion properties. The significance of such properties, as well as many other advantageous properties, will vary depending upon whether the polyurethanes are produced as fibers, moldable resins, coatings, elastomers or foams. For example, polyurethanes typically provide fibers that have a high elastic modulus, good electrical resistance, high moisture resistance, and an advantageous crystalline structure. Many of these properties are useful in forming so-called spandex fibers which include segmented polyurethane materials. Often, these take the form of poly(urea-urethanes) that are very elastomeric and not easily annealable. Furthermore, they typically must be spun under water or another liquid. Also, in order to prevent severe running of the knit when such fibers are knitted under tension, dacron or nylon fibers are typically wound around the spandex fibers to provide lubricity during knitting in order to minimize the result of these tensions. At times, it is desirable to provide a fiber of a similar or less elastomeric nature than the typical spandex segmented polyurethane and which can be knitted with less tension and can, if desired, be annealed to remove any remaining tensions. Properties of this type are especially desirable for the preparation of vascular grafts from spun fibers.

Moldable polyurethane resins have advantageous properties including excellent hardness, flexibility, abrasion resistance, resistance to impact, weathering, acids and alkalis, and the like. Even though polyurethanes as a class exhibit these types of advantageous properties, further improvements are often sought. For example, when attempting to develop moldable or thermosetting polyurethanes for medical or surgical uses, it is typically desirable to provide polyurethane-type materials that are of reduced thrombogenicity and that are especially resistant to oils and body fluids, including improved solvent and biological resistance. Improvements in the tensile strength of polyurethanes are also generally sought after.

The present invention provides polyurethane materials that are generally improved along these lines, including having the ability to be tailored to be suitable for use as a moldable resin or for use as a material that is spinnable in air, including the ability to be spun into fibers that are fine enough so as to be suitable for the spinning of vascular grafts and non-woven porous vascular grafts. The urethane polymer component of the spinnable homopolymer or block copolymer is formed from a reactant charge that is slightly hydroxyl-rich and not isocyanate-rich. The copolymer of the polyurethane and a fluoroalkylsiloxane is a poly(fluorosilicone urethane) having a backbone with repeating isocyanate groups and repeating organosiloxane groups.

It is accordingly a general object of the present invention to provide improved polyurethane materials and a method of polymerizing and forming same.

Another object of the resent invention is to provide improved polyurethanes which are spinnable in air into very fine filaments.

Another object of this invention is to provide improved polyurethanes which are spinnable under water if simply wound onto a bobbin, but which cannot be spun into a non-woven graft under water because translation of the fiber along the length of the graft causes excessive drag on the fibers and breakage thereof.

Another object of this invention is to provide improved fiber-forming segmented polyurethanes which can be spun in conjunction with the development of an electrostatic field.

Another object of the present invention is to provide improved polyurethane materials that are suitable for spinning into vascular grafts and the like.

Another object of this invention is to provide improved copolymers or block copolymers of polyurethanes and fluoroalkylsiloxanes that exhibit solvent and biological resistance, thromboresistance, and increased tensile strength when compared with polyurethane homopolymers.

Another object of this invention is to provide poly(fluorosilicone urethanes) that exhibit controlled solubility so as to be satisfactory for fiber spinning in air.

These and other objects, features and advantages of this invention will be clearly understood through a consideration of the following detailed description.

Polymers according to this invention are generally classifiable as polyurethanes, inasmuch as the backbone includes urethane groups and often also urea groups, which groups are recurring units within the polymer backbone. In its most preferred form, the polymer is a block copolymer of a polyurethane and a fluoroalkylsiloxane in order to thereby impart improved physical properties to the polymer. Without addition of the fluoroalkylsiloxane, the polymers are segmented polyurethane homopolymers. Such copolymers or homopolymers are preferably formulated so as to be fiber-forming or spinnable in air by appropriately controlling the reactant charge in order to form a high molecular weight urethane polymer that is soluble in polar organic solvents and that can be extruded through a fine orifice into an elongated, continuous fiber or strand that is strong enough to minimize its breakage when subjected to stress conditions and draw down immediately upon leaving the orifice, such as the conditions that occur when such fiber extrudates are wound under tension onto a mandrel. When a moldable polymer is desired, the reactant charge is designed to form pseudo-cross-links by allophanate formation, and chain extensions may also be carried out by forming biuretes.

Formation of polyurethane moieties according to this invention include reacting an —OH or hydroxyl group of a macroglycol component with an —NCO or isocyanate group of a diisocyanate compound in order to form a prepolymer. When it is desired to prepare a poly(fluorosilicone urethane) copolymer, the prepolymer reactant charge will also include a fluoroalkylsiloxane component.

Completing polymerization of the prepolymer is achieved by adding a desired chain extender. Typically, when the hydroxyl-terminated fluoroalkylsiloxane is included in the prepolymer charge, one of the —NCO groups of the diisocyanate component reacts with an hydroxyl group of a macroglycol module, and the other —NCO group of the diisocyanate reacts with an hydroxyl group of the fluoroalkylsiloxane component in order to form the copolymer. The prepolymerization and the chain extension typically will be carried out in the presence of a suitable solvent and under appropriate reaction conditions, although non-solvent reactions could be carried out, especially if the polymer is not to be extruded into fibers; for example, solvents are not needed to synthesize the polymer in block form.

While polymers according to the invention can be made in a non-solvent system as is generally known in the art, it is desirable to prepare the polymers in a solvent system when they are intended to be used for fiber spinning applications, and especially for fiber spinning of porous tubes such as biocompatible vascular grafts from high viscosity solvent solutions. When solvent-formed, the polymer usually is synthesized with a solids content of 60 percent or less. At a solids content greater than 60 percent, the polymer is extremely difficult to mix due to its high viscosity. The polymers could be synthesized in a single stage, rather than in the multiple stage approach of forming a prepolymer and subsequently further polymerizing same with a chain extender. Generally, single stage polymerizations form polymers that are not as controlled in their structure and that will crystallize differently from polymers formed by the two-stage approach.

Macroglycols suitable for use in formulating the polymers according to this invention are hydroxyl-terminated compounds having the general formula HO-R-OH, wherein R is a polyester, a polyether, a polyolefin, a polycarbonate, and the like, such as a polyesteramide, a polycaprolactone or a polyacrylate. Suitable molecular weight ranges are on the order of from 200 to 3000 Daltons. Polyols having a functionality greater than two can be copolymerized with these macroglycols on those occasions when it is desired to provide a cross-linked thermosetting product. Examples of macroglycols include polytetramethylene glycol, polyethylene glycols, polypropylene glycols, polyester diols and polycarbonate diols. Polytetramethylene glycol is especially preferred.

Other polyester moieties (the R moiety) of these macroglycols are generally included in reaction products of dihydric alcohols with dibasic carboxylic acids. Instead of the free dicarboxylic acids, the corresponding dicarboxylic acid anhydrides or corresponding dicarboxylic acid esters of lower alcohols or mixtures thereof can also be used for the preparation of polyester-polyol moieties. The dicarboxylic acids can be of an aliphatic, cycloaliphatic, aromatic and/or heterocyclic nature and can optionally be substituted. Dihydric alcohols which can be used, optionally mixed with one another, are, for example, ethylene glycol, propylene glycol, hexane-1,6-diol and diethylene glycol.

Polycaprolactone moieties of these macroglycols are exemplified as being included in those polyesters which are prepared by the polymerization of a lactone, for example of -caprolactone, or by the condensation of a hydroxycarboxylic acid, for example of -hydroxycaproic acid, with a starting material containing hydroxyl groups. Representative polyether macroglycol moieties include polyethers made from ethylene oxides, propylene oxides, butylene oxides, tetrahydrofuran, and mixtures thereof. Representative polyacrylate macroglycol moieties include dihydroxy functional acrylic copolymers. Exemplary polyesteramide macroglycol moieties are made by replacing small amounts of the diols used in making the polyesters described herein with compounds such as ethanol amine, isopropanol amine, ethylene diamine, and 1,6-hexamethylene diamine.

Diisocyanate reactants according to this invention have the general structure OCN—R'—NCO, wherein R' is a hydrocarbon that may include aromatic or non-aromatic structures, including aliphatic and cycloaliphatic structures. Exemplary isocyanates include the preferred methylene diisocyanate (MDI), or 4,4-methylene bisphenyl isocyanate, or 4,4'-diphenylmethane diisocyanate. Other exemplary isocyanates include hexamethylene diisocyanate and the toluene diisocyanates such as 2,4-toluene diisocyanate and 2,6-toluene diisocyanate, 4,4'tolidine diisocyanate, 4,4'-diphenylenemethane diisocyanate, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate), 3,3'-dimethyl-4,4'-diphenylmethane diisocyanate, 1,5-tetrahydronaphthalene diisocyanate, and mixtures of such diisocyanates.

When the poly(fluorosilicone urethane) block copolymers are to be prepared, the fluoroalkylsiloxane blocks are typically silanol-terminated monomers, although they can also be amine-terminated monomers and the like. Such poly(fluoroalkylsiloxane) blocks should have a molecular weight in the range of between about 200 and 3000 Daltons, and the fluoroalkylsiloxanes can have fluorine contents ranging from one to saturation. Alkoxy-terminated fluorosilicones or ringed fluorosilicones that react with glycols to form extended hydroxyl-terminated fluorosilicones that can further react with isocyanates can be included within the polyfluoroalkylsiloxanes according to this invention. The preferred polyfluoroalkylsiloxane is polymethyl-3,3,3-trifluoropropylsiloxane—silanol terminated.

Suitable chain extenders for completing the polymerization of the prepolymer should have a functionality that is equal to or greater than two. A preferred and well-recognized chain extender is 1,4-butanediol. Generally speaking, most diols or diamines are suitable, including the ethylenediols, the propylenediols, ethylenediamine, methylene dianiline and the like.

Insofar as the solvents are concerned, typically polar organic solvents are included, such as dimethylacetamide, in order to ensure a complete and homogeneous reaction. Other suitable solvents of a generally polar nature include dimethylformamide, tetrahydrofuran, cyclohexanone and 2-pyrrolidone. Such polar solvents typically are adequate by themselves at relatively low fluoroalkylsiloxane reactant levels (on the order of 20 percent or less), but at higher fluoroalkylsiloxane monomer contents, the resultant polymer tends to cloud if only these polar solvents are used, which condition is typically remedied by the addition of cosolvents or binary solvents in order to maintain and optimize solubility. Exemplary binary solvents include ketones such as methyl ethyl ketone, acetone, cyclohexanone and the like.

Other components such as catalysts, antioxidants, extrusion agents and the like can be included, although typically there would be a tendency or preference to exclude such components when a medical grade polymer is desired. In this regard, amine-containing solvents, such as the preferred dimethylacetamide, tend to catalyze the reaction, while others do not. Additives such as these are more likely to be needed when the polyurethanes are not solution polymerized.

When it is desired to provide a polyurethane homopolymer or copolymer that is a high molecular weight thermoplastic fiber-forming polymer which is soluble in polar organic solvents, the ratio of equivalents of the diisocyanate component to the sum of equivalents of the hydroxyl containing cmponents should, in general, be less than one. This ratio of equivalents results from a reaction charge that is hydroxyl-rich, rather than isocyanate-rich. The ratio represents the relative proportion of isocyanate equivalents present in the reaction charge (from the diisocyanate) to the total equivalents of hydroxyl groups present in the reaction charge (from a combination of the macroglycol, an hydroxyl functional chain extender, and any fluoroalkyl siloxane that is present). In practice, this ratio is conveniently determined by formulating a reaction charge that has a ratio of approximately 1 or that is slightly isocyanate-rich, such that gelling is observed. Then, further charges are made which slightly reduce the isocyanate charge in small increments, and such iteration is continued until gellation is no longer observed. When polyurethanes are desired which are not fiber-forming, this equivalents ratio should be equal to or greater than 1 to thereby form a polymer that is suitable for reaction injection molding or extrusion purposes. Ratios in excess of 1 result in the formation of pseudo-crosslinks by allophanate formation, and further extension can be achieved by the formation of biuretes.

The ratio of equivalents of the chain extender to the macroglycol plus the fluoroalkylsiloxane (if present) determines the hardness and elasticity modulus of the polyurethane homopolymer or copolymer. At very low ratios, such as less than 0.1, the product resembles a gum, while at very high ratios, for example in excess of 10, the product is extremely crystalline and non-elastomeric. The preferred range of this ratio of equivalents is between about 0.5 and about 5.

The principal limiting factor regarding possible ratios of the fluoroalkylsiloxane to the combined concentration of the macroglycol and fluoroalkylsiloxane is the solubility of the fluoroalkylsiloxane in the polymerization solvent system. A ratio of 0.1 was found to provide a suitable copolymer of polyurethane and fluoroalkylsiloxane.

Polyurethanes prepared according to this invention at 50% solids content provide a polymer solution viscosity of between about 500,000 and 3,000,000 centipoise. Molecular weights of the polyurethanes are variable, depending primarily upon the ratio of the macroglycol to the chain extender, with the greater ratio of macroglycol and fluoroalkyl siloxane to chain extender resulting, within limits, in the greater molecular weights. A typical molecular weight range of a polyurethane homopolymer or copolymer in accordance with this invention is between about 50,000 to about 300,000 Daltons, preferably on the order of about 150,000 Daltons or greater, such molecular weights being determined by measurement according to the polystyrene standard.

EXAMPLE I

A flask containing polytetramethylene glycol (having a molecular weight of about 650) and a sintered glass boiling chip was dried out by evacuating the contents to 0.1 to 0.3 mm Hg while heating it to 100 to 120° C. with agitation for one hour. Dry nitrogen was released into the flask periodically to purge it of water vapors. A supply of 1,4-butanediol was dried similarly but at a temperature not exceeding 100° C. These dried reactants were stored at room temperature in sealed containers under molecular sieves and dry nitrogen. The alcohol content was determined titrametrically. The water content was also determined titrametrically and maintained at less than 200 ppm.

A sealed drum of frozen methylene diisocyanate was thawed out by tumbling it in a water bath at 50° to 100° C., and the melted isocyanate was transferred under nitrogen into clean and dry round bottom flasks. The percent isocyanate content was determined titrametrically before the isocyanate was charged into the reaction vessel.

The prepolymer polymerization was commenced by first charging a heated (70° C.) 500 ml round bottom flask with 53.55 grams of the methylene diisocyanate (about 4.5 equivalents), then adding a hot solution (95°-100° C.) containing 31.10 grams of the polytetramethylene glycol (about 1 equivalent). The addition was performed swiftly under constant agitation and nitrogen purging. The reaction was mixed, at ambient temperature, while exotherming; the exotherm temperature was as high as 120° C. (Higher exotherm temperatures should be avoided as the solution will yellow and may degrade.) After one hour of mixing this prepolymer, complete polymerization was achieved by adding a hot (95°-100° C.) solution containing 15.07 grams of 1,4-butanediol chain extender (about 3.5 equivalents) in 85 grams of well-dried dimethylacetamide. The solution was further mixed under nitrogen for one hour, then the thickened polyurethane solution was transferred from the mixer to an oven where the reaction was continued at 65° C. for 24 hours. The polyurethane solution was then filtered to disperse gels and remove particles.

The polyurethane solution thus synthesized was inserted into an apparatus for forming vascular grafts on a mandrel by passing the polyurethane solution through a plurality of fine orifices in the nature of hypodermic cylinders in order to form the polyurethane in air into a plurality of fibers which were then wound over the mandrel in order to successfully form a non-woven vascular graft. The ratio of the equivalents of isocyanate to alcohol in this segmented polyurethane that forms fibers in air was between 0.990 and 0.999.

EXAMPLE II

Using only well-dried or predistilled reactants in a dehumidified glove box, 242.57 grams of polytetramethylene glycol (molecular weight of 658.06), together with 30.10 grams of polymethyl-3,3,3-trifluoropropylsiloxane—silanol terminated (molecular weight of 735) and 250.00 grams of dimethylacetamide were added to a well-dried Erlenmeyer flask. The flask was swirled until the contents became clear and then placed in an oven at 95° C. for one hour. In a disposable bottle, 194.16 grams of methylene diisocyanate (molecular weight of 250) was added and stored in an oven at 43° C. for 30 minutes. The solution from the flask was then added to the methylene diisocyanate solution and mixed for one hour at ambient temperature (approximately 40° C. in the glove box). The reaction color changed from clear to yellow-opaque over the reaction period. The reaction product was a prepolymer of methylene diisocyanate, polytetramethylene glycol and the fluoroalkylsiloxane in dimethylacetamide solution.

Polymerization was completed by adding a solution containing 33.17 grams of 1,4-butanediol (molecular weight of 90.00) and 250 grams of dimethylacetamide. The butanediol solution was heated to 95° C. prior to being added to the prepolymer, and only half of the solution was added, waiting 30 minutes before adding the remainder of the solution. After mixing for an additional 30 minutes at ambient temperature, the copolymer was placed in an oven at 70° C. and heated for 2-12 hours.

The resultant copolymer was transparent gray and formed fibers in air. Upon cooling, the polymer became significantly whiter, thicker and opaque. Adding cyclohexanone as a binary solvent or cosolvent with dimethylacetamide in a 50/50 blend tended to increase the clarity of the polymer solution throughout the reaction. The poly(fluorosilicone urethane) copolymer exhibited a modulus of approximately Shore 80A, it contained 10% equivalents of fluorosilicone relative to the equivalents of the polytetramethylene glycol, and it had a 50% solids content. The ratio of butanediol to macroglycol plus fluoroalkylsiloxane was 1, and the isocyanate ratio was 0.998.

It will be understood that the embodiments of the present invention which have been described are illustrative of some of the applications of the principles of the present invention. Numerous modifications may be made by those skilled in the art without departing from the spirit and scope of the invention.

I claim:

1. A segmented polyurethane solution for forming fibers in air, comprising:
   a polymeric backbone having a recurring groups selected from the class consisting of urethane groups, urea groups and combinations thereof;
   said polyurethane is a reaction product of reactants including: a macroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1; and
   wherein said polymeric backbone includes:
   (a) a linkage site at which one of said terminal isocyanate groups of a diisocyaate reactant moiety had reacted with one of said terminal hydroxyl groups of the macroglycol reactant moiety; and
   (b) a linkage site at which another terminal isocyanate group of the diisocyanate reactant moiety had reacted with one of said terminal hydroxyl or amine groups of the chain extender.

2. An article of manufacture including a segmented polyurethane fiber comprising:
   an extrusion formed in air from a polyurethane solution including a polar solvent and a polyurethane polymer, said polyurenthane polymer including:
   a polymeric backbone having recurring groups selected from the class consisting of urethane groups, urea groups and combinations thereof; and
   said polyurethane is a reaction product of reactants including: a macroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1.

3. The article of manufacture according to claim 2, wherein said polymeric backbone includes:
   (a) a linkage site at which one of said terminal isocyanate groups of a diisocyanate reactant moiety had reacted with one of said terminal hydroxyl groups of the macroglycol reactant moiety; and
   (b) a linkage site at which the other terminal isocyanate group of the diisocyanate reactant moiety had reacted with one of said terminal hydroxyl or amine groups of the chain extender.

4. The article of manufacture according to claim 2, wherein said chain extender is selected from the group consisting of a diol and a diamine.

5. A method of making a biocompatible vascular graft, comprising:
   polymerizing a reactant charge including: a macroglycol reactant having terminal hydroxy groups, a chain extender with terminal hydroxyl or amine groups, a diisocyanate reactant having terminal isocyanate groups, and a polar solvent, said reactant charge having a ratio of equivalents of isocyanate grous to the sum of equivalents of hydroxyl groups and amine groups that is less than 1 in order to provide a fiber-forming biocompatible polyurethane solution;
   extruding said fiber-forming biocompatible polyurethane solution through an orifice in order to form an elongated fiber in air;
   winding said elongated fiber on a mandrel such that the continuous fiber forms a plurality of windings that define a non-woven cylinder having overlying fibers that contact one another to form a surface that is conducive to tissue growth thereinto; and
   removing the non-woven polyurethane cylinder from the mandrel to provide a biocompatible porous vascular graft.

6. The method according to claim 5, wherein the reactant charge includes a fluoroalkylsiloxane, and wherein the polyurethane solution is a solution including a poly(fluorosilicone urethane) that is fiber-forming in air.

7. The fiber-forming polyurethane according to claim 1, wherein said polyurethane has a molecluar weight of between about 50,000 and about 300,000 Daltons, such molecular weight being measured according to the polystyrene standard.

8. The fiber-forming polyurethane according to claim 7, wherein said molecular weight is on the order of about 150,000 Daltons or greater.

9. A segmented polyurethane solution for forming fibers in air, comprising:
a polymeric backbone having recurring groups selected from the class consisting of urethane groups, urea groups and combininations thereof;
said polyurethane is a reaction product of reactants including: a macroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1; and
wherein said polyurethane has been processed to remove particles or disperse gels exhibiting pseudo-crosslinks by allophante formation.

10. A segmented polyurethane solution for forming fibers in air, comprising:
a polymeric backbone having recurring groups selected from the class consisting of urethane groups, urea groups and combinations thereof;
said polyurethane is a reaction product of reactants including: a macroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1; and
wherein said polyurethane has been processed to remove particles or disperse gels exhibiting pseudo-crosslinks by biurete formation.

11. The fiber-forming polyrethane according to claim 9, wherein said polyurethane is extrudable through a fine orifice into an elongated, contiuous fiber.

12. The fiber-forming polyurethane according to claim 10, wherein said polyurethane is extrudable through a fine orifice into an elongated, continuous fiber.

13. The fiber-forming polyurethane according to claim 10, wherein said polyurethane has been processed to disperse gels exhibiting pseudo-crosslinks by allophanate formation.

14. A segmented polyurethane solution for forming fibers in air, comprising:
a polymeric backbone having recurring groups selected from the class consisting of urethane groups, urea groups and combinations thereof;
said polyurethane is a reaction product of reactants including: a macroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1; and
wherein said polyurethane has a molecular weight of between about 50,000 and about 300,000 Daltons, such molecular weight being measured according to the polystyrene standard; and
wherein said polyurethane is extrudable through a fine orifice into an elongated, continuous fiber, said polyurethane having been processed to disperse gels exhibiting pseudo-crosslinks.

15. The fiber-forming polyurethane according to claim 1, wherein said polyurethane solution has as solids content of 60 percent or less.

16. A segmented polyurethane solution for forming fibers in air, comprising:
a polymeric backbone having recurring groups selected from the class consisting of urethane groups, urea groups and combinations thereof;
said polyurethane is a reaction product of reactants including: a mcroglycol reactant having terminal hydroxyl groups, a chain extender with terminal hydroxyl or amine groups, and a diisocyanate having terminal isocyanate groups, wherein the ratio of the equivalents of isocyanate groups to the sum of euqivalents of hydroxyl groups and amine groups is less than 1;
said polyurethane has a molecular weight of between about 50,000 and about 300,000 Daltons, such molecular weight being measured according to the polystyrene standard; and
wherein said polyurethane has been processed to disperse and remove gels exhibiting pseudo-crosslinks.

17. the article of manufacture according to claim 2, wherein said polyurethane has a molecular weight of between about 50,000 and about 300,000 Daltons, such molecular weight being measured according to the polystyrene standard.

18. The article of manufacture according to claim 16, wherein said molecular weight is on the order of about 150,000 Daltons or greater.

19. The article of manufacture according to claim 2, wherein said extrusion was formed through a fine orifice into an elongated, continuous fiber, said polyurethane polymer having been processed to disperse and remove gels of allophanate-formed pseudo-crosslinks.

20. The article of manufacture according to claim 2, wherein said extrusion was formed through a fine orifice into an elongated, continuous fiber, said poplyurethane polymer having been processed to disperse and remove gels of allophante-formed pseudo-crosslinks and remove gels of biurete-formed pseudo-crosslinks.

21. The article of manufacture according to claim 2, wherein said polyurethane polymer has been treated to remove gels exhibiting pseudo-crosslinks by allophanate formation and to remove gels exhibiting pseudo-crosslinks by biurete-formation.

22. The article of manufacture according to claim 2, wherein said polyurethane polymer has a molecular weight of between about 50,000 and about 300,000 Daltons, such molecular weight being measured according to the polystyrene standard; and
said polyurethane polymer has been processed to disperse gels exhibiting pseudo-crosslinks.

23. An article of manufacture including a segmented polyurethane fiber comprising:
an extrusion formed in air from a polyurethane solution including a polar solvent and a polyurethane polymer, said polyurethane polymer including:
a polymeric backbone having recurring groups selected from the class consisting of urethane groups, urea groups and combinations thereof;
said polyurethane is a reaction product of reactants including: a mcroglycol reactant having terminal hydroxyl groups, a chain extender with terminal hydroxyl or amine groups, and a diisocyanate having terminal isocyanate groups, wherein the ratio of the equivalents of isocyanate groups to the sum of equivalents of hydroxyl groups and amine groups is less than 1;

said polyurethane polymer has a molecular weight of between about 50,000 and about 300,000 Daltons, such molecular weight being measured according to the polystyrene standard; and said plyurethane polymer, prior to extrusion, had been processed to disperse and remove gels exhibiting pseudo-crosslinks.

24. The method according to claim 5, wherein said polymerizing step is carried out such that the polyurehtane of the poyurethane solution has a molecular weight of between about 50,000 and about 300,000 Daltons, such molecular weight being measured according to the polystyrene standard.

25. The method according to claim 5, further including processing the polyurethane of the polyuretane solution to disperse and remove gels of allophanate-formed orbiurete-formed pseudo-crosslinks.

26. The method according to claim 24, further including processing the polyurethane of the polyurethane solution to disperse and remove gels of allophanate-formed or biurete-formed pseudo-crosslinks.

27. A method of making a biocompatible vascular graft, comprising:

polymerizing a reactant charge including: a macroglycol reactnat having terminal hydroxyl groups, a chain extender with terminal hydroxyl or amine groups, a diisocyanate reactant having terminal isocyanate groups, and a polar solvent, said reactant charge being such as to provide a fiber-forming biocompatible polyurethane solution including a polyurethene polymer having a ratio of equivalents of isocyanate groups to the sum of equivalents of hydroxyl groups and amine groups that is less than 1 and having a molecular weight of between about 50,000 and about 300,000 Daltons, such molecular weight being measured according to the polystyrene standard;

extruding said fiber-forming biocompatible polyurethane solution through an orifice in order to form an elongated fiber in air;

winding said elongated fiber on a mandrel such that the continuous fiber forms a plurality of windings that define a non-woven cylinder having overlying fibers that contact and adhere to one another to form a surface that is conducive to tissue growth thereinto; and removing the non-woven polyurethane cylinder from the mandrel to provide a biocompatible porous vascular graft.

* * * * *

UNITED STATES PATENT AND TRADEMARK OFFICE
CERTIFICATE OF CORRECTION

PATENT NO. : 4,810,749

DATED : March 7, 1989

INVENTOR(S) : Leonard Pinchuk

It is certified that error appears in the above-identified patent and that said Letters Patent is hereby corrected as shown below:

```
Col. 7, line 68, "diisocyaate" should read --diisocyanate--.
Col. 10, line 64, "mcroglycol" should read --macroglycol--.
```

Signed and Sealed this

Sixteenth Day of April, 1991

*Attest:*

HARRY F. MANBECK, JR.

*Attesting Officer*

*Commissioner of Patents and Trademarks*